(No Model.)
W. F. EDWARDS.
SEED PLANTER AND FERTILIZER DISTRIBUTER.
No. 284,826. Patented Sept. 11, 1883.
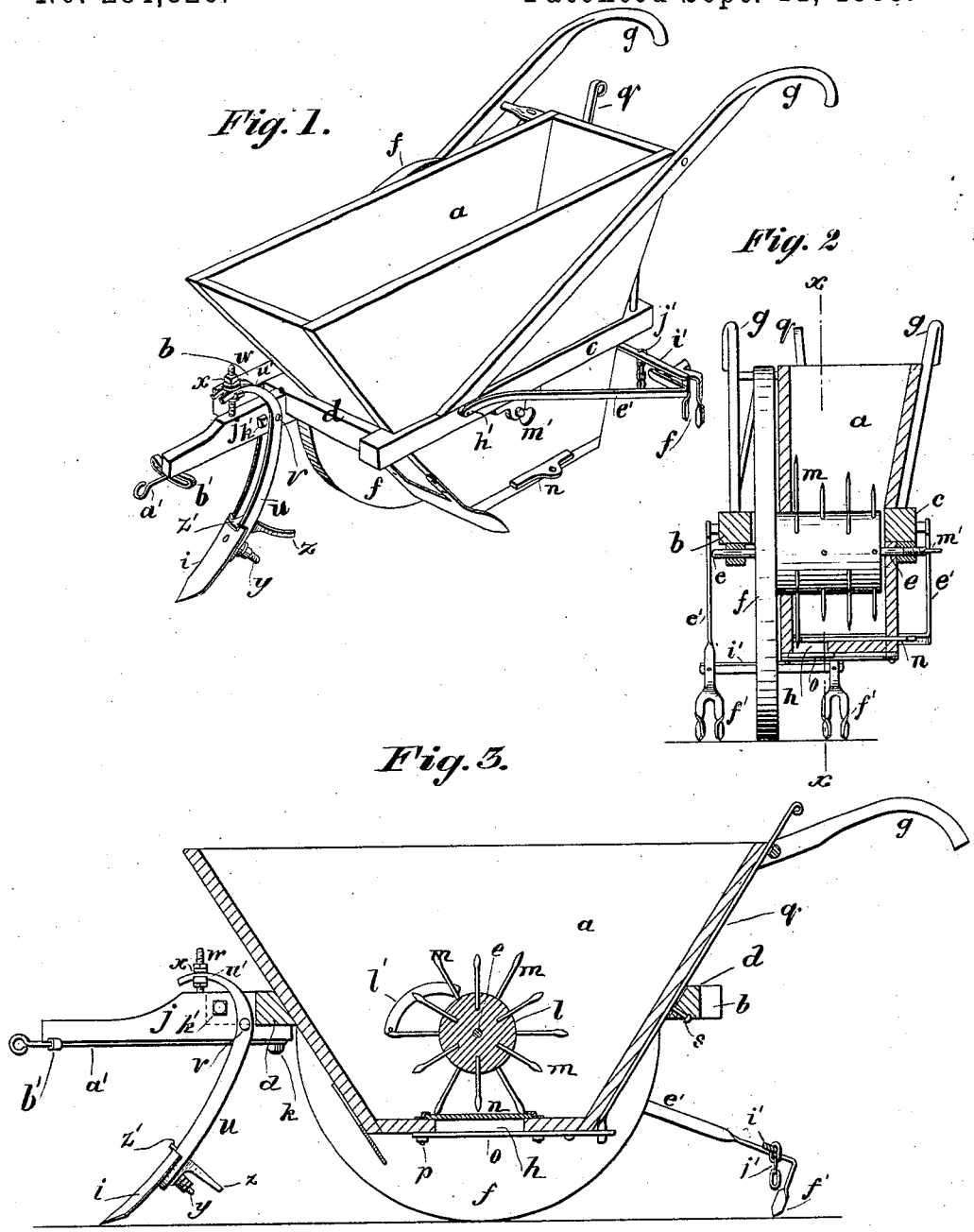
WITNESSES:
INVENTOR:
W. F. Edwards
BY Munn & Co.
ATTORNEYS.

UNITED STATES PATENT OFFICE.

WILLIAM F. EDWARDS, OF COVINGTON, GEORGIA.

SEED-PLANTER AND FERTILIZER-DISTRIBUTER.

SPECIFICATION forming part of Letters Patent No. 284,826, dated September 11, 1883.

Application filed April 6, 1883. (No model.)

*To all whom it may concern:*

Be it known that I, WILLIAM F. EDWARDS, of Covington, in the county of Newton and State of Georgia, have invented a new and Improved Seed-Planter and Fertilizer-Distributer, of which the following is a full, clear, and exact description.

This invention pertains to improvements in a combined seed-planter and fertilizer-distributer; and it consists of the combination and arrangement of parts, substantially as hereinafter fully set forth and claimed.

Reference is to be had to the accompanying drawings, forming part of this specification, in which similar letters of reference indicate corresponding parts in all the figures.

Figure 1 is a perspective view of my improved seed-planter and manure-distributer. Fig. 2 is a transverse section in the axis of the wheel and the dropper-shaft, and Fig. 3 is a longitudinal sectional elevation of the machine on the line $x$ $x$ of Fig. 2.

I mount a hopper, $a$, of convenient size and suitable form for use in a cotton or other seed dropper or planter, or a manure-distributer, on a suitable frame consisting of side bars, $b$ $c$, and end bars, $d$, by a shaft, $e$, which may have one or two wheels, $f$, to be preferably located inside of the side bars of the frame, one being sufficient, as the machine may be readily held upright by the handles $g$. When only one wheel is used, it will be arranged at the inside of bar $b$, and the opening $h$, through which the seed and manure are to be discharged, will be arranged at the side of the bottom of the hopper next to the wheel, to range behind the plow $i$, of which the beam $j$ is bolted at $k'$ to the side of the end of bar $b$, that projects beyond the end bar, $d$, the rear end of the beam being also lapped under and bolted on the end bar, $d$, by bolt $k$.

The shaft $e$ has a cylinder, $l$, mounted on it for attaching pins $m$, of which there is one row, on a true circumferential line over the discharge-opening $h$, and being in practice long enough to project into and partly through it, for more effectually discharging the seed and manure, and the rest are in a spiral arrangement for working the contents of the hopper to the place of discharge. A curved scraper, $l'$, is attached to the side of the hopper, for the teeth of the circle next thereto to rub against and be cleared of anything adhering to them, and a set-screw, $m'$, is to be arranged against the end of the shaft in the box of the frame side bar $c$, to set the cylinder so as to cause the teeth to bear with the requisite pressure on the said plate $l'$.

I propose to use one slide or gate, $n$, for closing the passage $h$ when the discharging is to be stopped, and another one, $o$, to regulate the quantity of the discharge. The latter gate is pivoted at $p$, and is connected to a lever, $q$, extending up behind the hopper, to which it is pivoted at $s$, for enabling the operator to work it.

The plow-foot $u$ consists of a rod or bar of iron bent double from the bottom up, and being arranged on both sides of the beam $j$, to which it is pivoted at $v$, and from the pivot $v$ it is bent forward at $u'$ over the top of the beam, where an adjusting-screw, $w$, is arranged between the two branches, with adjusting-nuts $x$ to shift the inclination of the plow. The plow $i$ is screwed onto the lower end of the foot by a bolt, $y$, which also secures clod-pusher $z$, consisting of arms projecting laterally and backwardly from the foot for thrusting the clods away.

The horse is to be hitched on by a rod, $a'$, secured to the beam by the bolt $k$, on which it is capable of swinging through the range of a yoke, $b'$, in which it is arranged at the front end of the beam to allow it to swing, so that the machine may be kept in its course by the attendant when the horse diverges from right to left from the true course.

I propose to have a couple of rake-tooth or forked plows, $f'$, to run behind the machine for covering the seed or manure, said covering devices being connected to the ends of rods $e'$, pivoted to the side of the frame at $h'$, and being connected behind the hopper by a cross-bar, $i'$, to which a chain, $j'$, is attached for lifting the plows up from the ground, when required, for turning the machine about.

As the regulating-slide $n$ does not require to be wholly closed, it will be seen that the row of teeth $m$ next to the side of the hopper may be long enough to extend below the slide and into the space $h$ above the lower slide, $o$, for more effectually preventing the matters being dropped from clogging. I propose to arrange these teeth so that they may be shifted to run the flat points sidewise or edgewise, as preferred.

For more substantially securing the clod crusher or pusher $z$ than the bolt $y$ alone will do, I have provided the pusher with a T-head, $z'$, which extends up between the bars of the plow-foot and crosses it to form a substantial holder, to prevent the pusher from pulling off, and also to prevent it from turning on the bolt.

Having thus described my invention, I claim as new and desire to secure by Letters Patent—

1. The combination of the curved scraper, connected to the hopper $l'$, with the circumferential line of arms $m$, arranged over the discharge-opening $h$, substantially as described.

2. The combination of the scraper $l'$ and adjusting-screw $m'$ with the cylinder $l$, and the circumferential line of arms $m$ over the discharge-opening, substantially as described.

3. The plow-foot $u$, pivoted to the beam $j$ at $v$, and having the forked or bifurcated arms $u'$, curved forwardly above the said beam, in combination with the adjusting-screw $w$, clamped in the slot of the bifurcated curved plow-foot arms, and bearing in the beam $j$, essentially as shown and described, and for the purpose set forth.

4. The clod-pusher $z$, having T-head $z'$, in combination with the plow-foot $u$ and the fastening-bolt $y$, substantially as described.

WILLIAM F. EDWARDS.

Witnesses:
H. A. JONES,
W. J. SMITH.